Nov. 1, 1960    A. E. WOLFE, JR., ET AL    2,958,179
ELECTRONIC CLOCK AND INTERVALOMETER
Filed Jan. 23, 1950    7 Sheets-Sheet 1
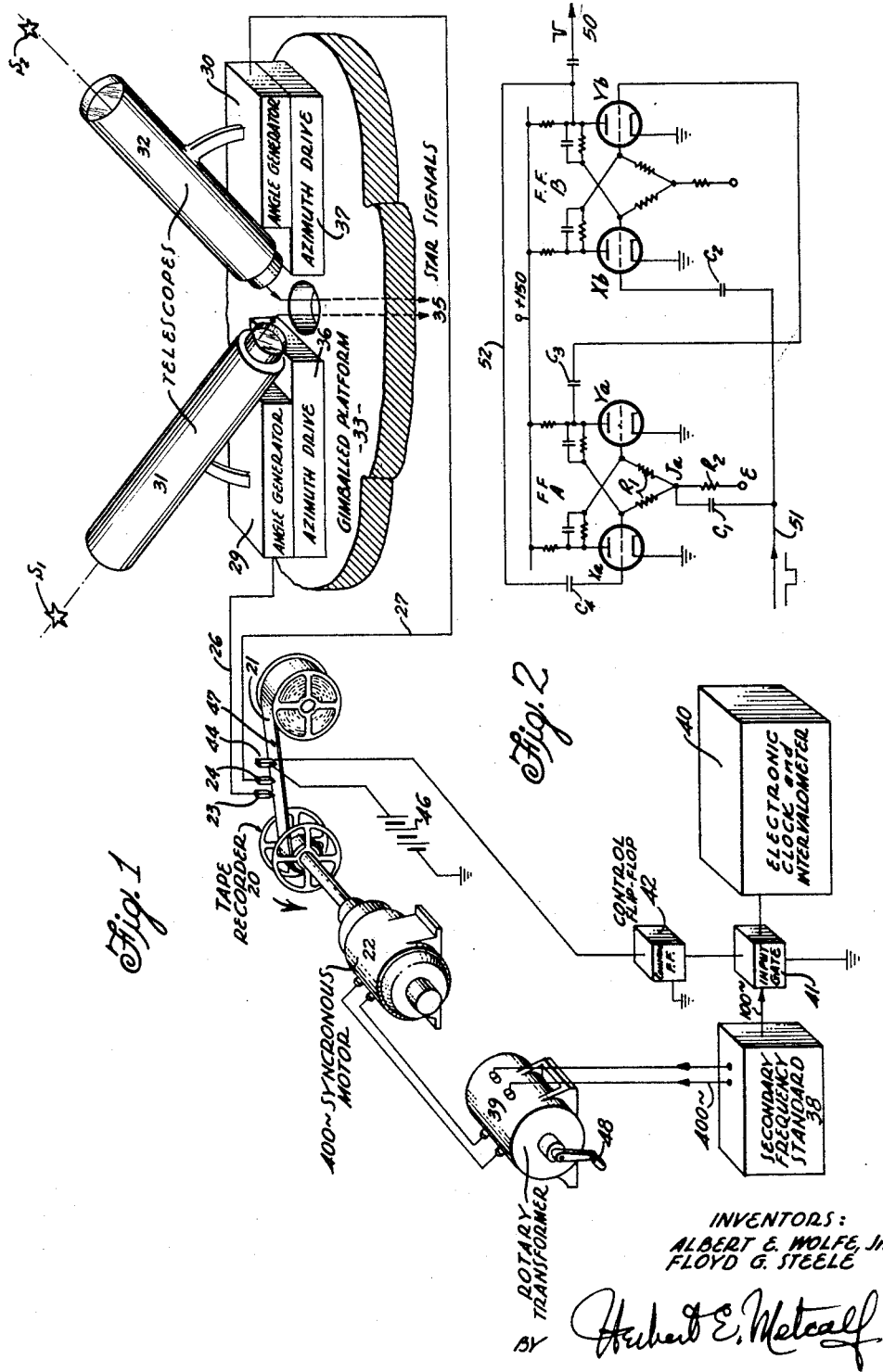
INVENTORS:
ALBERT E. WOLFE, Jr.
FLOYD G. STEELE
BY Herbert E. Metcalf
ATTORNEY Nov. 1, 1960  A. E. WOLFE, JR., ET AL  2,958,179
ELECTRONIC CLOCK AND INTERVALOMETER
Filed Jan. 23, 1950  7 Sheets-Sheet 2

INVENTORS:
ALBERT E. WOLFE, Jr.
FLOYD G. STEELE
BY Herbert E. Metcalf
ATTORNEY

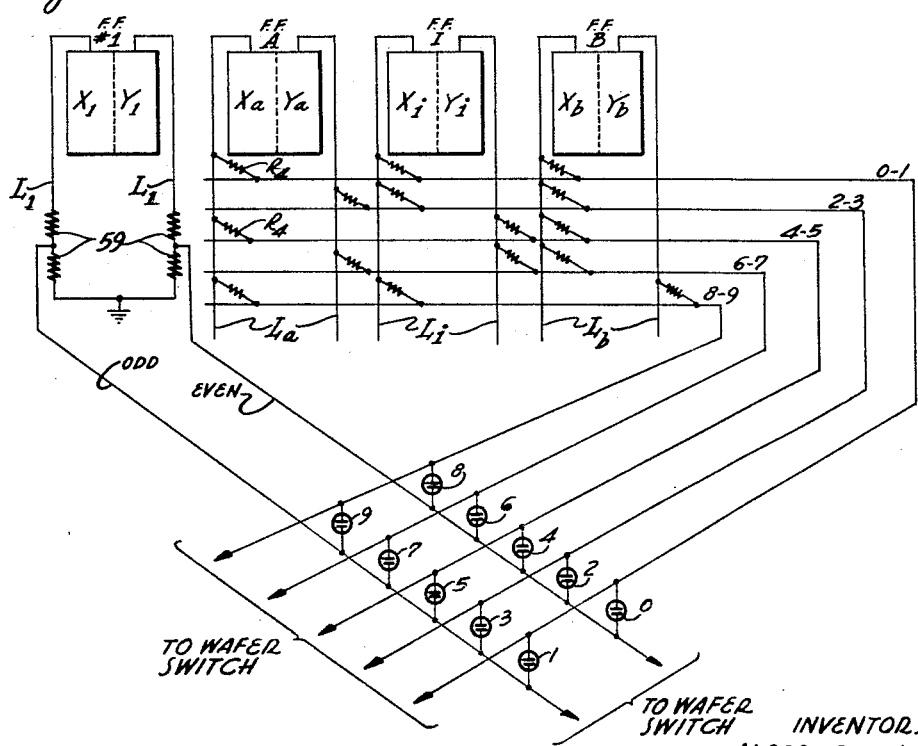

Nov. 1, 1960

A. E. WOLFE, JR., ET AL 2,958,179

ELECTRONIC CLOCK AND INTERVALOMETER

Filed Jan. 23, 1950

INVENTORS:
ALBERT E. WOLFE, Jr.
FLOYD G. STEELE

BY Herbert E. Metcalf
ATTORNEY

Nov. 1, 1960 A. E. WOLFE, JR., ET AL 2,958,179
ELECTRONIC CLOCK AND INTERVALOMETER
Filed Jan. 23, 1950 7 Sheets-Sheet 5

INVENTORS:
ALBERT E. WOLFE, Jr.
FLOYD G. STEELE
BY Herbert E. Metcalf
ATTORNEY

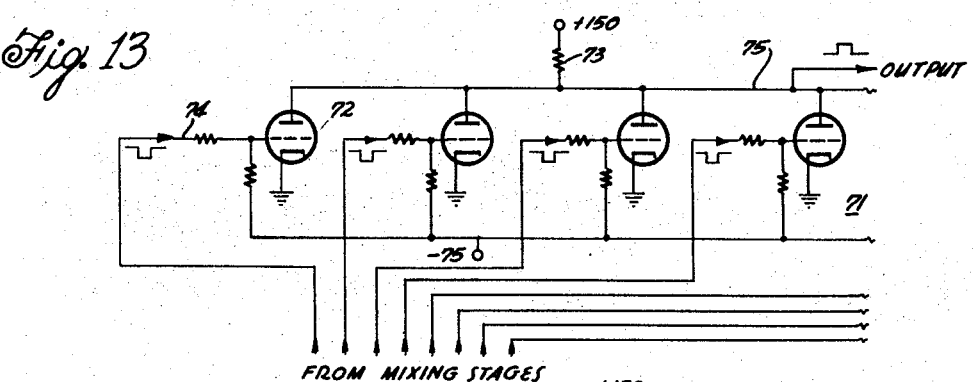
Fig. 13
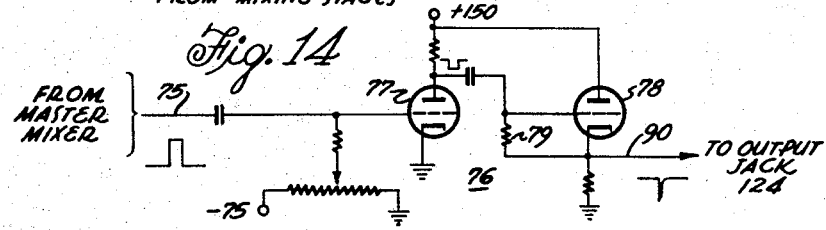
Fig. 14
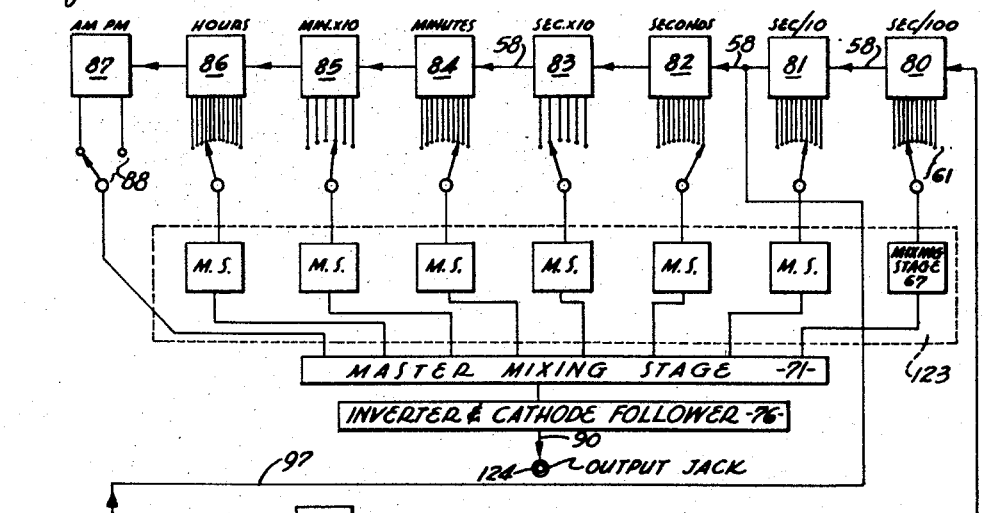
Fig. 15
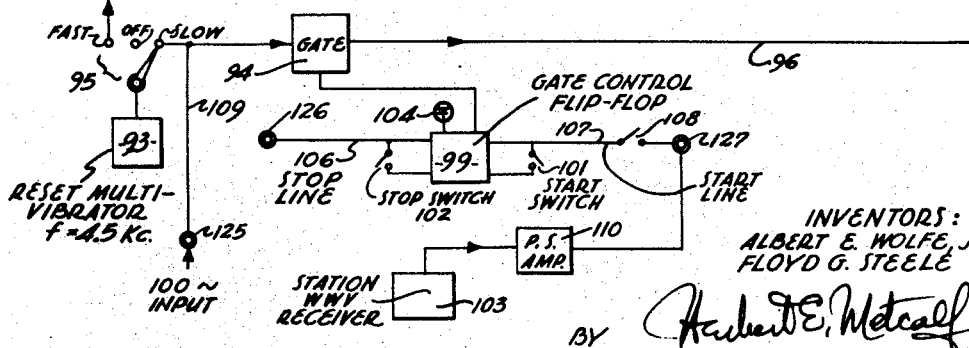

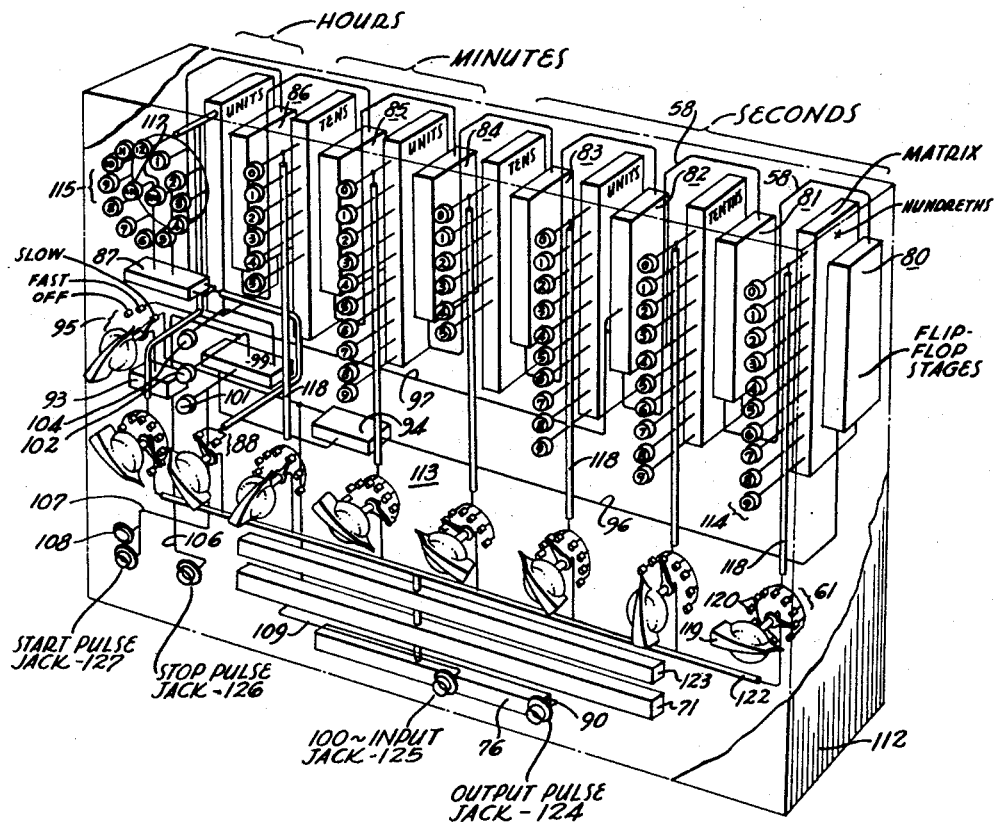

United States Patent Office 2,958,179
Patented Nov. 1, 1960

2,958,179

ELECTRONIC CLOCK AND INTERVALOMETER

Albert E. Wolfe, Jr., Compton, and Floyd G. Steele, Manhattan Beach, Calif., assignors to Northrop Corporation, Hawthorne, Calif., a corporation of California Filed Jan. 23, 1950, Ser. No. 139,984

11 Claims. (Cl. 58—24)

This invention relates to electronic clocks and more particular to the type including means for accurately measuring intervals of time.

One of the problems of implementing a particular system for automatic navigation of a craft by reference to the stars is to provide a time reference device which can be utilized for synchronizing the operation of the system with standard time.

This problem is especially important when the particular system chosen exactly specifies, ahead of time, the trajectory which the craft will fly.

One practical realization of a guidance system utilizing the predetermined or specified trajectory hinges primarily on the physical establishment of the specified apparent vertical direction on board the navigated craft. It can be shown that this direction can be established in relation to the apparent lines to two stars. However, since it has been found most convenient to measure acceleration errors in the horizontal plane which is normal to the specified apparent vertical, it is desirable to first set up this plane by specifying the altitude angle of two star lines above it. The normal to this plane then becomes the specified apparent vertical desired.

For any given track and time schedule these apparent star altitude angles relative to the specified horizontal plane can be computed for every instant of flight from available astronomical data.

These computed star altitudes, for example, are magnetically recorded on a tape and played back from the tape, on board a craft during flight, as electrical pulses. This information is fed into angle setting devices which lay down the specified apparent horizontal platform with respect to a pair of star lines established on board by automatic star tracking telescopes.

One of the objects of this invention is to provide an electronic clock which can be utilized for determining the absolute starting time of this magnetic tape playback unit.

Another object of this invention is to provide an electronic clock that gives a direct reading of time for a 24 hour period.

Another object of this invention is to provide a novel matrix circuit arrangement for the indicator lamps of the counting circuits.

Still another object of this invention is to provide an intervalometer which can accurately measure to $1/100$ of a second, any interval of time within a 24 hour period.

Briefly, the present invention provides an extremely accurate electronic clock comprising counting or frequency dividing circuits which respond to pulses from a secondary low frequency standard. The face of the clock is provided with indicator lamps which are arranged so as to give a direct reading of the time for a 24 hour period in: hours, ten minutes, minutes, ten seconds, seconds, tenths of seconds and hundredths of seconds. Means are provided for enabling the clock to accurately determine the time interval between two pulses and transmit a pulse at a previously determined time. In addition, reset means are provided for facilitating setting of the clock to any desired time.

This invention can be more fully understood by reference to the drawings in which:

Figure 1 is a general system layout showing the use of the present invention.

Figure 2 is a full circuit diagram showing the fundamental interconnecting arrangement for the flip-flop networks used in the counting circuits.

Figure 6 is a table showing the conditions of the tubes, in the decade counter of Figure 5, as it counts through a cycle.

Figure 7 is a schematic diagram of the decade counter showing the connections of the matrix for the positional indicator lamps and the output lines.

Figure 13 is a wiring diagram of the master mixing stage for detecting the time setting of the electronic clock.

Figure 14 is a wiring diagram of the inverter and cathode follower output circuit.

Figure 15 is a schematic block diagram of a preferred embodiment of the electronic clock.

Figure 16 is a schematic perspective illustration showing the preferred arrangement of the components of the electronic clock.

Figure 3:
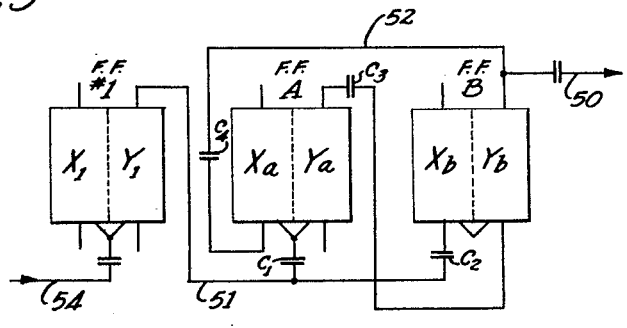
Figure 3 is a block diagram of a three stage counting circuit having a radix six.

Referring first to Figure 1, a celestial navigation system layout is provided showing the use of the present invention.

Here, a tape recorder 20 having a tape 21 is adapted to be driven by a 400 cycle synchronous motor 22. On tape 21 two channels of data have been previously magnetically recorded so that, as the tape 21 is moved under the coil pickup heads 23 and 24, pulses are generated on data lines 26 and 27, respectively, at a proper time schedule. The pulses on data lines 26 and 27 are fed into angle generators 29 and 30 respectively, which translate the pulses into elevation angles mechanically laid off between the star tracking telescopes 31 and 32, and the gimballed platform 33. The deviations of the optical axes of the telescopes 31 and 32 from the lines to the stars $S_1$ and $S_2$, respectively, are sensed as star signals 35 which operate on the telescope azimuth drives 36 and 37 and the gimballed platform 33 so as to cancel the error.

As was previously pointed out, the altitude angle data on the tape 21 must be synchronized with actual time, hence the linear playback speed of the magnetic tape is controlled by a secondary frequency standard 38 consisting of a temperature controlled quartz crystal oscillator and several frequency dividers (not shown). Secondary frequency standard 38 sends a 400 cycle signal through rotary transformer 39 to precisely drive the 400 cycle synchronous motor 22.

The secondary frequency standard 38 is also the source of the 100 signal used for operating the electronic clock and intervalometer 40. This latter signal is fed to clock 40 through a clock input gate 41. For this particular system, the clock input gate 41 is controlled by a flip-flop 42 triggered by a pulse obtained by an auxiliary pickup 44 cooperating with the magnetic tape 21.

When utilizing equipment such as this for navigation of a missile, the lauching and precelestial guidance system controls the craft from the launching point to the initial (or departure) point on the specified celestial trajectory. The craft is controlled so that it arrives at the departure point with negligible positional error, at the specified time, and with the specified velocity vector.

Although the information on the magnetic tape 21 is not used to control the craft at launching and for a period thereafter, the magnetic tape motor drive 22 is actuated prior to launching and an initial blank portion of the tape 21 is moved past the coil pickup heads 23 and 24 until the starting epoch (time and place) for celestial navigation is reached. In order to ensure that the steady controlled movement of the tape 21 to the point where the information thereon is to be utilized, is properly synchronized with standard time, an initial synchronizing pulse is generated shortly after the tape recorder 20 is actuated while still on the ground.

This initial pulse is obtained by means of a series circuit comprising battery 46, the auxiliary pickup 44, and the control flip-flop 42. Auxiliary pickup 44 is actually a switch which is fixed above the tape 21 to have sliding contact therewith. A silver foil 47 is secured to the tape 21 near the beginning of the blank portion and in the path of pickup 44. As the tape 21 progresses, the open terminals of auxiliary pickup 44 are momentarily shorted by the foil 47. This closes the series circuit so that battery 46 sends a pulse to trigger control flip-flop 42 and close input gate 41.

This synchronizing pulse has attached to it a standard time which is known. By utilizing this pulse to stop the electronic clock 40, which was previously running at standard time, a measure of the lead or lag of the tape recorder 20 is obtained by comparing the reading at which the clock 40 stopped, with the time corresponding to the position of the foil 47 on the moving tape. This error is usually on the order of about .02 of a second and is corrected manually by adjustment of the rotary transformer 39.

The rotary transformer 39 has the characteristic that if its primary, say, is rotated one complete revolution; the change in its frequency output, during the movement, is equivalent to speeding up or slowing down the tape .0025 of a second. Thus, by rotating the handle 48, of the rotary transformer 39, once in the proper direction for each .0025 second error, the linear speed of the tape 21 can be slowed up or increased, to bring the time at which the signals are generated in the coil pickup heads 23 and 24, in synchronism with actual time.

This completes the description of the general set-up of a system making use of the present invention. It should be noted that the present invention is concerned wholly with the electronic clock and intervalometer. The remaining circuitry and components of Figure 1 are claimed elsewhere.

Referring next to Figure 2, the basic arrangement employed in this invention of interconnecting the flip-flops for forming the counting circuits is shown. The flip-flop networks A and B are interconnected so as to form an odd number counting circuit. It will be shown that the several counters, of different radices, used in the electronic clock of the present invention can be made up from the arrangement of these two fundamental flip-flops by combining additional flip-flops which function in an ordinary binary fashion.

The particular embodiment of Figure 2 gives a tertiary counting circuit, i.e., a circuit which resets, or cycles, to a zero designated condition of its tubes and emits a pulse to outgoing circuit 50 when three input pulses are received on incoming circuit 51.

The two tubes in each of the flip-flops used in the present invention have their plates and grids intercoupled, as is well known, so that when a common potential is applied across them they will settle at a stable state such that one tube is conducting and the other tube is non-conducting. The flip-flop will then remain in its existing state until switched by a properly applied pulse.

For example, flip-flop A can be triggered by applying a negative polarity pulse at a junction $J_a$ which is connected to the grids of each of the tubes through individual resistors $R_1$. Junction $J_a$ is further connected to a negative potential E through a bias resistor $R_2$. This arrangement of input resistors, when used in this way to trigger a flip-flop, is well known as a modified Eccles-Jordan circuit. Flip-flop A, for example, can also be triggered or caused to change its state by applying input pulses directly to the grid of one of its tubes. For instance, in the present invention, by applying a negative pulse directly to the grid of a conducting tube, the opposite tube can be made to conduct. In general, a pulse applied at the input to the grid of such a flip-flop network is considered to be less critical and more effective in action than a similar pulse applied at the common input.

As noted, the left and right tube of each of the flip-flops is assigned the letters X and Y, respectively, with appropriate subscripts. As the right tube in each flip-flop has the outgoing lead connected thereto, tubes $Y_a$ and $Y_b$ are known as carry tubes, and tubes $X_a$ and $X_b$ are known as non-carry tubes.

For the particular arrangement of flip-flops in Figure 1, incoming circuit 51 is connected through a first input capacitor $C_1$ to the junction $J_a$ of flip-flop A. Incoming circuit 51 is also connected through a second input capacitor $C_2$ to the grid of tube $X_b$ of flip-flop B.

The output from the carry plate of tube $Y_a$ is then connected through an interconnecting capacitor $C_3$ to the grid of the other tube, $Y_b$, of flip-flop B.

To complete the present hookup, a feedback line 52 is connected from the plate of tube $Y_b$ to the grid of tube $X_a$ through a feedback capacitor $C_4$. The outgoing circuit 50 from the counter is likewise taken from the plate of tube $Y_b$.

In order to explain the operation of the tertiary counter assume that the $Y_a$ and $Y_b$ tubes are conducting and that negative polarity square pulses are being applied on the incoming circuit 51. The first of these input pulses, applied at the junction $J_a$ of flip-flop A, turns tube $X_a$ on and turns tube $Y_a$ off. This first input pulse has no effect on flip-flop B however, inasmuch as it is applied to the grid of tube $X_b$ which is already off.

The result of the change in state of flip-flop A causes a rise in potential at the plate of tube $Y_a$. However, this rise in potential is gradual due to transients in the network so that it is effectively attenuated through the differentiating circuit comprised of interconnecting capacitor $C_3$ and the resistance of the grid of tube $Y_b$.

The second negative polarity input pulse applied on incoming circuit 51 again reverses the state of the flip-flop A, causing tube $Y_a$ to again conduct. The drop in potential thus created on the plate of tube $Y_a$ is of a sudden nature as contrasted with the previous gradual potential rise so that it is communicated through interconnecting capacitor $C_3$ as a peaked negative carry pulse onto the grid of tube $Y_b$.

It is noted that as a result of this second input pulse, two distinct actions are imposed on flip-flop B. First, the second input pulse is impressed directly as a negative pulse on the grid of non-carry tube $X_b$; secondly, the negative carry pulse, which was emitted from flip-flop A as a result of the second input pulse on it, is impressed on the grid of carry tube $Y_b$. These negative pulses obviously act in opposition on flip-flop B. However, the negative carry pulse impressed on the grid of tube $Y_b$ predominates over the second input pulse applied to the grid of tube $X_b$ for two reasons.

In the first place, the input pulses applied on the incoming circuit 51 is comparable in magnitude and width with the carry pulses from tube $Y_a$; but, whereas the carry pulses are applied directly, the incoming pulses are divided so as to be applied to both flip-flops. Thus the carry pulses are always stronger signals. In the second place, the carry pulse is delayed with respect to the input pulse by the time required for flip-flop A to produce it, so that the carry pulse exists after the incoming pulse has disappeared.

Thus the second pulse effectively changes the state of both flip-flop A and flip-flop B. It should be noted that the slow rise in potential on the plate of tube $Y_b$, as flip-flop B is changed by the second input pulse, is not communicated over the feedback line 52 to the grid of tube $X_a$, since, as explained before, positive going changes in potential are not passed by the feedback differentiating circuit comprised, in this case, of capacitor $C_4$ and the chosen resistance of the grid of tube $X_a$.

The third input pulse on incoming circuit 51 starts to change the state of flip-flop A as was accomplished by the previous two input pulses. However, before this triggering action can be realized, the third input pulse, which is also applied on the conducting tube $X_b$, causes flip-flop B to change state. The resulting sudden drop in potential on the plate of tube $Y_b$ is immediately communicated as a differentiated peaked pulse on feedback line 52 to the non-conducting tube $X_a$ of the flip-flop A and prevents the third input pulse, which has been applied on the less sensitive input junction $J_a$ of flip-flop A, from changing its state.

This same carry pulse which is fed on feedback line 52 for blocking the triggering effect of the third input pulse on flip-flop A, is fed as an output pulse on outgoing circuit 50.

Thus one output pulse has been fed out on outgoing circuit 50 for three input pulses on the incoming circuit 51. Moreover, the flip-flops have now cycled back, or reset, to the condition with tubes $Y_a$ and $Y_b$ "on" and tubes $X_a$ and $X_b$ "off," as originally assumed, so that the fourth input pulse finds the flip-flops in the same condition as the first input pulse.

This completes the description of the fundamental hookup utilized for obtaining the counting circuits of the present invention. The manner in which additional binary stages will be added to obtain the radix counters or scalars required will next be described.

Referring to Figure 3, a simplified block diagram of a counter is shown with a flip-flop #1 preceding the A and B flip-flops. The block diagram of each flip-flop illustrates in particular the right and left triode tubes X and Y, respectively. Furthermore, the common input J, and the inputs to each of the grids of the tubes are indicated at the bottom of the block; and, the two outputs from the plates of the tubes are indicated at the top of the blocks. This arrangement of flip-flops; i.e., a counting circuit which resets after three input pulses are applied, preceded by an ordinary flip-flop functioning as a binary stage, forms a radix six counter. The flip-flop #1 divides the incoming pulse rate fed in on line 54 by two, and the radix three counter divides the output rate from flip-flop #1 by three. The result is division by six.

Figure 4:
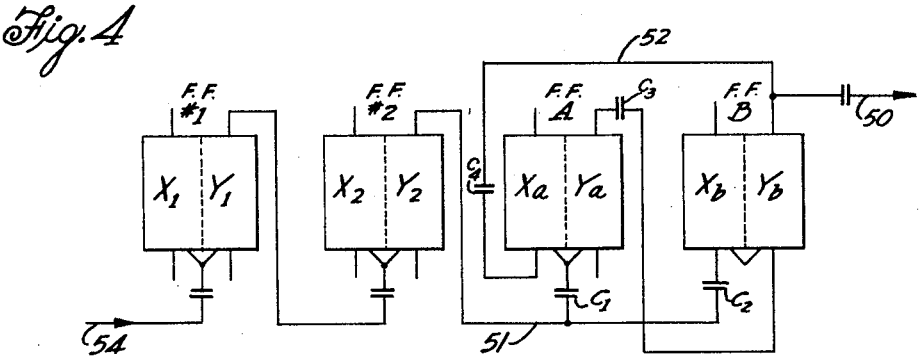
Figure 4 is a block diagram of a four stage counting circuit having a radix twelve.

In Figure 4, a counting circuit which enables counting in the radix twelve is illustrated. This circuit is simply obtained by adding an additional flip-flop #2 in the cascade prior to the A and B flip-flops. The flip-flops #1 and #2 divide the incoming rate, fed in on line 54, by four in an ordinary binary fashion, and carry the result into the radix three counter which divides its input by three, thus resulting in division by twelve.

Figure 5:
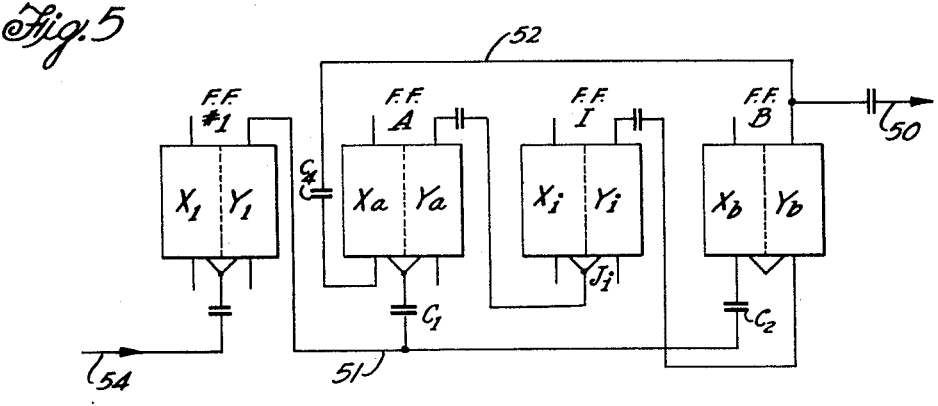
Figure 5 is a block diagram of a four stage counting circuit having a radix ten.

Figure 5 shows a block diagram of the arrangement of a cascade which resets after ten input pulses are applied. This circuit diagram shows an intermediate flip-flop I comprised of tubes $X_i$ and $Y_i$ inserted between flip-flops A and B. It is seen here that the interconnection of flip-flops A and B have not been changed except for the fact that the output from tube $Y_a$ is connected to the junction $J_i$ of the intermediate flop-flop I, while the output from the plate of tube $Y_i$ is connected to the grid of tube $Y_b$. The preceding ordinary flip-flop #1, which functions as a binary stage, divides the incoming rate by two; and the remaining portion of the counting circuit divides by five. Hence a decade counting circuit has been obtained.

In the preferred embodiment of the electronic clock and intervalometer, which is to be described: two of the radix six; four of the radix ten, and one of the radix twelve counting circuits, as above disclosed, will be used.

The arrangement of these flip-flops for forming these variable radix counting circuits does not form a part of this invention except in combination therewith.

Although the counting circuits have been presented, the manner in which indicator bulbs can be connected to enable visual reading of the counter content has yet to be disclosed. In addition, output lines which can be used for electrically indicating the digits of the counter have yet to be shown.

The matrix set-up for obtaining these indications will be described in detail for the radix ten or decade counter. This will be facilitated by first referring to Figure 6 which is a chart of the condition of the tubes of the decade counter in Figure 5 as it counts through a cycle. It is noted that the condition of the flip-flops is denoted by the combination of the digits 1 and 0. In each of the columns, designating the flip-flops, a 01 condition indicates that the right hand tube or the Y tube is conducting, and the left tube or the X tube is non-conducting. A 10 condition indicates the opposite state of the flip-flop. A carry pulse occurs when a flip-flop changes from a 10 to a 01 condition. Thus it is seen that initially the flip-flops are all in the 01 condition. As the first nine input pulses are fed into the #1 flip-flop (Figure 5) the succeeding flip-flops count and carry in an ordinary binary fashion. However, as before described in connection with Figure 2, because of the feedback arrangement between flip-flops B and A, the tenth pulse is permitted only to change the last flip-flop and thus return the tubes of the cascade to their original orientation.

Figure 7 shows a block diagram indicating the order of cascading the flip-flops for the decade counter. The interconnections of the flip-flops have not been shown here for simplicity. The only connections indicated are the outputs from the plates of the flip-flops. From each of the plates of the flip-flops, A, I and B, a pair of vertical lines $L_a$, $L_i$, and $L_b$, respectively, are connected. For this particular matrix, five horizontal lines marked 0–1, 2–3, 4–5, 6–7 and 8–9 are arranged to intermesh with the pair of vertical lines $L_a$, $L_i$, and $L_b$. The right portion of these horizontal lines are extended downwardly and then diagonally to the left.

Similarly, from the plates of the tubes of the first flip-flop #1, a pair of vertical lines $L_1$ is connected. Each of the lines $L_1$ is grounded through a voltage divider 59. Output connections are then made from these voltage dividers 59. The connection to the right vertical line $L_1$ will be hereafter known as the "even" line and the connection to the left as the "odd" line. These latter lines extend downwardly and then diagonally to the right thus crossing the previously described array of diagonal lines. At each junction, of the diagonal matrix thus provided, a neon bulb is connected. Two diagonal rows of neons following the extensions of the "even" and "odd" lines are thus formed. One row has neons connected from each of the five diagonals, formed by the extensions of the horizontal lines, to the single "even" diagonal line from flip-flop #1. These neons are denoted by the even digits of the corresponding horizontal lines. The other row has neons connected from each of the five diagonals of the horizontal lines to the single "odd" diagonal from flip-flop #1. These latter neons are denoted by the odd digits of the corresponding horizontal lines.

In order to determine how to interconnect the matrix formed by the intersection of the horizontal lines with the plate lines from the flip-flops, reference is made to Figure 6. Here it is noted that as the decade counting circuit responds to ten successive pulses in a cyclical manner, the condition of the tubes of the last three flip-flops automatically switch to five unique patterns. These patterns can be identified by the potentials on the plates of the tubes. In this particular embodiment, the location of the resistors, like resistor $R_4$, which connect certain plate lines to the horizontal lines are determined by the high polarity plates for a given digit pattern. For example, the conditions of the last three flip-flops, when the digits 0 and 1 are contained in the counter, are such that all the left plates, the X plates, are of a high polarity. Thus resistors, like resistor $R_4$, connects the left plates of each of the last flip-flops to the horizontal line 0–1. The condition of the flip-flops for the digits 2 and 3 are such that flip-flop A has a high polarity on the right plate while the flip-flops I and B have a high polarity on their left plates. Thus resistors, like resistor $R_4$, are connected from these latter three plates to the horizontal line 2–3. Likewise, the remaining horizontal lines 4–5, 6–7, and 8–9 are connected by resistors, like resistor $R_4$, to the flip-flops using the same scheme. It will be seen that all the resistors $R_4$ are of the same value and serve to lower the high potential existing on plates to an appropriate value for applying across the neon bulbs.

Figure 8:
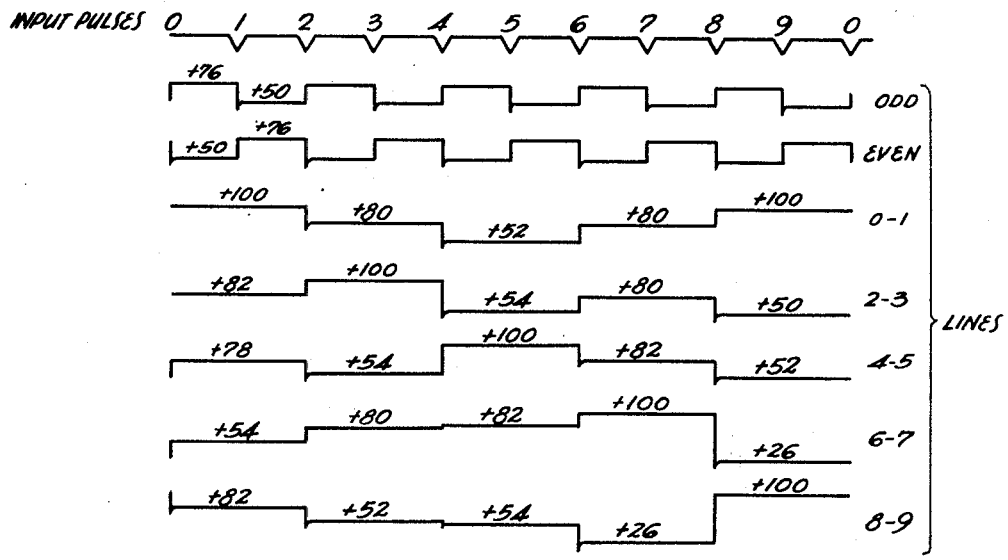
Figure 8 is a chart showing the cyclical voltages across the indicator lamps and on the output lines of the decade matrix.

Figure 8 is a graph showing the polarities existing on the lines of the matrix of Figure 7 as the counter responds to successive input pulses. It is clearly revealed here that the horizontal lines have a relatively high polarity, in this case +100 volts, only when the digits by which they are designated, are contained in the counting circuit. For any other number content of the counter, the horizontal lines have relatively low potentials impressed thereon. Figure 8 also reveals that the potentials on the "odd" and "even" lines from flip-flop #1 are alternately at a high and low polarity. Hence, in order to discern which of the two numbers on each of the horizontal lines is in the counter, the two states of the flip-flop #1 are employed. The neons, arranged as previously described at the diagonal junctions, have the characteristic that they will fire only when the horizontal line on one side is at a high polarity, and the "odd" or "even" line on the opposite side is suddenly changed to a low polarity as shown in Figure 8. The overshoot of the drop in polarity of the "odd" or "even" lines creates the potential differential required to fire the neons. The neon bulbs, as noted, are indicated by digits which correspond to the content of the counter when they are fired.

The terminals from the "even" and "odd" lines from flip-flop #1, and the terminals of the diagonals from the horizontal lines constitute the output lines to additional circuits which enable any predetermined time to be electrically sensed as an output pulse.

Figure 9:
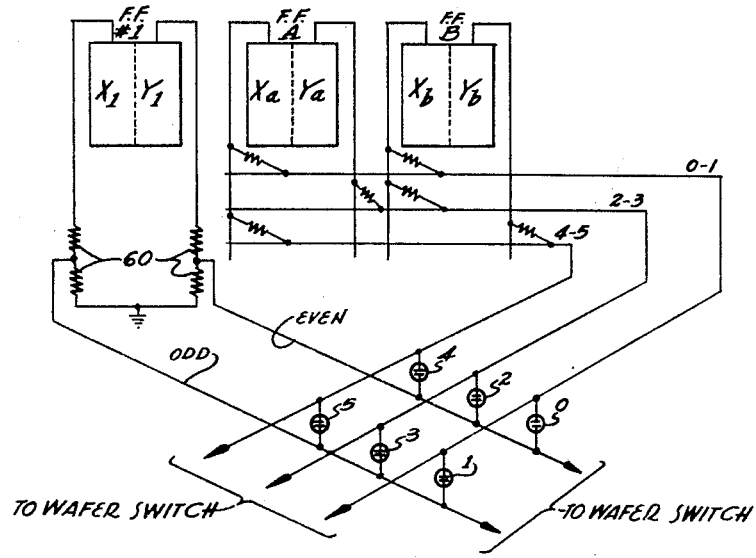
Figure 9 is a schematic diagram of the radix six counter showing the connections of the matrix for the indicator lamps and output lines.

A schematic diagram showing the matrix and circuit connections for the radix six counter is next illustrated in Figure 9. In this case, three horizontal lines 0–1, 2–3, 4–5, are arranged in the matrix. Each of the horizontal lines, as before, are connected through resistors so as to have the high potential plates associated with each unique setting of the latter three flip-flops, connected thereto. In order that the potential on the low side of the neon bulbs, impressed on the even and odd lines from the first flip-flop, is sufficiently negative, the potentials on the plates are reduced, as before, in voltage dividing circuits 60.

Figure 10:
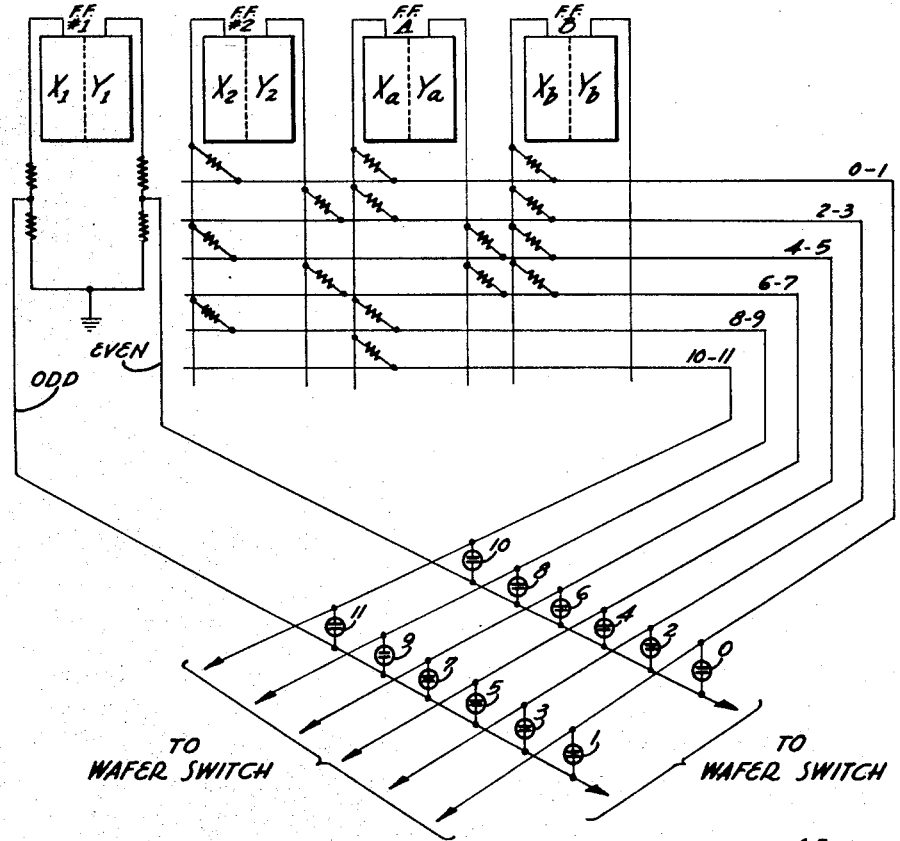
Figure 10 is a schematic diagram of the radix twelve counter showing the connection of the matrix for the indicator lamps and output lines.

Figure 10 shows the matrix and circuit connection for the radix twelve counter. The scheme used in this circuit for connecting the plates of the flip-flops to the six horizontal lines 0–1, 2–3, etc., is similar to that in Figures 7 and 9 and will not be described in detail here.

Figure 11:
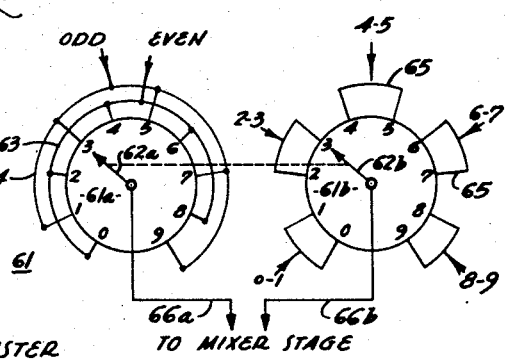
Figure 11 is a schematic diagram showing the wafer switches and connections for the decade counter.

Figure 11 is a schematic diagram showing the manual switches 61 utilized for selecting any digit of the decade counter of Figure 7. The switches are made up of two wafers $61_a$ and $61_b$. Each of the wafers has on its face a circular arrangement of ten contacts marked to correspond to the digits of the counter. A movable arm $62_a$ and $62_b$ is rotatably mounted in the center of each wafer such that it can be manually set to engage any one of the ten contacts. The movable arms $62_a$ and $62_b$ are mechanically linked together so that they always read the same digital position. Wafer switch $61_a$ is used to select either the "even" or "odd" output lines from flip-flop #1 of Figure 7. Hence, it has two circular leads 63 and 64 associated therewith which connect to the "even" line and the "od" line respectively. The outer circular lead 64 is then connected to all the odd number designated contacts and the inner circular lead 63 is then connected to all the even number designated contacts of the wafer.

The other wafer switch, $61_b$, is used to select one of the five horizontal lines 0–1, 2–3 etc., associated with the flip-flops A, I, and B of Figure 7. Hence the combination of contacts 0 and 1, 2 and 3, etc., are connected by jumpers 65. Each of these jumpers is then connected to the diagonal extensions of its corresponding horizontal line. The switch output lines $66_a$ and $66_b$ from the wafer switches are taken from the pivot of the two rotary arms $62_a$ and $62_b$. It is now evident that the switch output line $66_a$ will be of a low polarity and the switch output line $66_b$ will be of a high polarity when the digit corresponding to the setting of the wafer switches is contained in the counter.

Similar wafer switches, using the same connecting scheme, are provided for each of the other counting circuits utilized in the present invention.

Figure 12:
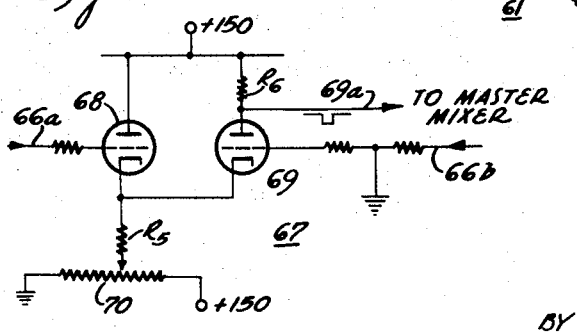
Figure 12 is a wiring diagram of a mixing stage for detecting the number condition of one of the counters.

In order to be able to have a single output signal when a digit is reached in a counter, the outputs from the two wafer switches 61 are fed into a mixing stage 67 as shown in Figure 12. This mixing stage is comprised of a cathode follower 68 feeding into an output triode 69. The plate of cathode follower 68 is connected directly to the positive source +150 v. and its cathode is connected to ground through a fixed resistor $R_5$ which is tapped to a variable voltage dividing circuit 70. Cathode follower 68 is ordinarily conducting. However, when the low potential from the even or odd lines, whichever is active, is applied onto the grid of cathode follower tube 68, tube 68 becomes non-conducting and its cathode potential falls due to the absence of current in cathode resistor $R_5$. Output triode 69 is normally non-conducting. However, when the requisite positive pulse from the chosen horizontal line is applied on the grid of triode 69 at the same instant that the cathode follower tube 68 is rendered non-conducting, triode 69 becomes momentarily active thus causing the output lead 69a from its plate to have a negative square wave imposed thereon due to the current flow in the plate resistor $R_6$.

It should be noted that the lowering of the cathode of triode 69 alone, due to the cutting off of cathode follower tube 68, is not sufficient to cause triode 69 to conduct; nor is a positive pulse on the grid of triode 69 alone, without a simultaneous lowering of potential in its cathode, sufficient to cause conduction.

Each of the counting circuits have a similar mixing stage which enables its digit content to be sensed as a single negative polarity output pulse. As will be shown, seven counting circuits of the above nature are used, hence seven such mixing stages are provided.

All of these mixing stages have their output lines fed into a master mixing stage 71 shown in Figure 13 which functions to emit an output pulse only when all of its inputs are simultaneously energized, thus indicating when a particular time, as preset on the manually adjusted wafer switches, is reached.

Master mixing stage 71 consists of eight triodes such as triode 72. All of these triodes have a common plate load resistor 73 and separate inputs such as input 74 on each of the eight fixed biased grids. Seven of these inputs are derived from the seven outputs from the mixing stages described in connection with Figure 12. The other input is obtained from the output of an A.M.-P.M. flip-flop which will be more clearly described in connection with Figure 15. This master mixing stage 71 circuit is such that if current is flowing through any one, or a plurality, of the triodes 72 the common plate voltage is relatively low; however, if all the triodes 72 are momentarily cut off, the common plate voltage is relatively high due to the disappearance of a voltage drop across plate resistor 73. Thus, there is a positive square wave output on a common output line 75 when and only when negative inputs to all of the eight grids are simultaneously present.

The output from the master mixing stage 71 is fed into the inverter and cathode follower circuit 76 shown in Figure 14. The positive polarity square wave is differentiated and is impressed as a sharp pulse on the grid of the normally cut-off inverter tube 77. The negative pulse on the plate of tube 77 is fed into a cathode follower 78 having a reduced grid bias 79 which enables the cathode follower 78 to accommodate negative signals of higher amplitude on its grid without the effects of cut-off limiting. Thus a low impedance output signal is obtained on output lead 90 from cathode follower 78 which indicates that the time indicated by the reading manually set on the wafer switches of the clock has been reached.

This completes the detailed description of the components utilized in the electronic clock and intervalometer of the present invention.

Figure 15 is a complete schematic block wiring diagram of the present invention indicating, among other things, how a plurality of the counting circuits, above described, are arranged in cascade with carry lines 58 interconnecting them so as to give the time readings to an accuracy of a hundredth of a second over a twenty-four hour period.

Starting from the right, the first four counting circuits 80, 81, 82 and 83 are employed for counting various orders of the time interval seconds; the next two counting circuits 84 and 85 for counting orders of the time intervals minutes; and the next counting circuit 86 for counting in the time interval hours. The last counting circuit 87, comprising a single binary stage, is used for indicating A.M. and P.M. The first three second counting circuits 80, 81 and 82, representing the hundredths, tenths, and units of seconds, have a radix ten. The last second counter 83, representing ten second intervals, has the radix six. The minutes counter 84, counting units of minutes, has a radix ten and the other minute counter 85, counting ten minute intervals, has the radix six. The latter counting circuit 85 feeds into the hours counting circuit 86 which has a radix twelve. In order to keep track of the A.M. and P.M. time, the binary counting circuit 87 is triggered by the output from the hours counting circuit 86.

The number content of each of these counting circuits is indicated both visually and electrically by the output matrix circuits and connections as described in particular, in the preceding discussion, for a radix ten counter.

As shown and described also in connection with a typical radix counter, a wafer switch, such as switch 61 in Figure 11, is used in conjunction with a mixing stage, such as mixing stage 67 in Figure 12, for sensing the number content of each of the counting circuits. The outputs from all the mixing stages, like stage 67, are then fed into master mixing stage 71 which only has an output when all the mixing stages are energized.

It should be noted that the indication of A.M. or P.M. of the binary counting circuit 87 dispenses with a mixing stage because of its simplicity. Either output from the binary circuit 87 is fed directly to the master mixing stage 71, and causes it to trigger in accordance with the setting of a two-way switch 88 which serves the same function as the wafer switches associated with the other counting circuits.

As previously described, the output from the master mixing stage 71 is fed into the inverter and cathode follower circuit 76 which emits a low impedance negative pulse to the output lead 90.

Figure 15 also shows schematically the reset circuit and the starting and stopping circuits for the electronic clock.

To facilitate setting the clock at any given time indicated by the manual setting of the wafer switches, a reset multivibrator 93 feeding through a reset switch 95 is provided. Multivibrator 93 is free running at approximately 4.5 kc. The reset switch 95 has three positions: a "fast" position, a "slow" position, and an "off" position. In the "slow" position, the differentiated output of multivibrator 93 is fed through an input gate 94 to an incoming conductor 96 connected to the first counting circuit 80. In the "fast" position setting, the differentiated output of the multivibrator 93 is fed directly to the third counting circuit 82 on fast reset line 97, thus bypassing input gate 94 and the first two counting circuits 80 and 81, i.e., the sec./100 and the sec./10 units. This is done to quickly cycle the remaining counting circuits to their approximate final position.

In order to obtain the exact desired setting of the clock, use is made of the coincidence circuiting arrangement. At the instant all the clock counting circuits have the content shown by the manual settings of the associated wafer switches 61, the output pulse, obtained from the inverter and cathode follower unit 76, is used for closing input gate 94 to the output from the multivibrator 93.

A flip-flop 99 is provided for controlling input gate 94. Flip-flop 99 can be manually triggered to open or close input gate 94 by means of start and stop switches 101 and 102 respectively which, when closed, connect the grids of the right and left tube of flip-flop 99 respectively to the common low potential junction of its input resistance network. For example, when the switch 101 is closed, the left tube is made to conduct which is the proper state for the opening of input gate 94 since it is the high potential of the right tube plate which opens gate 94. A neon bulb 104, connected from the right plate of gate control flip-flop 99 to ground, lights up when the gate is open.

The flip-flop 99 can also be electronically triggered. For example, a stop line 106, connected to the left grid, is provided whereby a negative pulse applied on this line can be used for closing input gate 94. Similarly, a start line 107 is provided for opening the input gate when a negative pulse is applied thereto.

Hence, in order to rest the clock at a given time, the negative output pulse from the inverter and cathode follower output unit 76 is connected by an external jumper (not shown) from its output jack 124 to the stop jack 126 feeding stop line 106. Thus, after having approximately obtained the desired setting by the fast resetting circuit from the multivibrator 93, the reset switch 95 is set to its "slow" position which feeds input pulses through input gate 94 which is manually set to be open at this time.

As soon as the required number, as determined by the positions of the various switches, is present in the clock, a pulse appears at the output of the inverter and cathode follower 76 which triggers the gate control flip-flop 99, thus closing the input gate 94. The reset multivibrator 93 is now turned off by turning setting switch 95 to its "off" position. A 100 cycle input is then connected to the input jack 125 on the terminal of line 109 leading to the input gate 94. However, this 100 cycle input does not start the clock operating until a proper signal is obtained for opening the input gate 94. The entire reset operation just described is very fast, taking on the average 30 to 45 seconds.

The clock is now ready to start operating when it receives a starting signal having a time designation which coincides with its setting. This clock was designed to be started by a time pulse from station WWV. A WWV time pulse is a radio signal emitted by the Bureau of Standards at Washington, D.C. This signal is a 1000 cycle sine wave, which is picked up by a radio receiver 103 and fed into a pulse shaping amplifier 110 which feeds into the start line 107. This pulse shaping amplifier 110 develops a series of five sharp pulses from the five 1000 cycle sine waves which make up a WWV one-second pulse. By listening to a voice announcement of the time from the WWV station, the signal pulse corresponding to the desired time can be determined by an absence of certain previously designated pulses. Hence, by closing initiating switch 108, during the preannounced absence of signal pulses, the operator can be assured that the next pulse, the desired pulse, will start the clock.

Referring to Figure 16, a preferred arrangement of the electronic clock and intervalometer components are shown in a schematic perspective illustration. Here it is noted that the components are enclosed in a rectangular housing 112. Inside housing 112, the counting circuits 80 through 86 comprised of flip-flops and matrix networks are arranged in cascade with carry lines 58 as previously shown in Figure 15. The neon bulb indicator lamps associated with the matrices of the second and minute groups of counting circuits 80 through 85 are arranged in vertical rows, such as row 114, on the face 113 of the clock housing 112. In addition, the twelve neon bulbs, associated with the hour counting circuit 86, are arranged in a circular display 115 at the left of the face 113 so as to conform to the reading of a conventional clock. In the center of circular display 115 are two neon bulbs 117 associated with the A.M.–P.M. counting circuit 87 disposed inside the housing below circular display 115. From the matrices associated with each counting circuit, a conduit, such as conduit 118, is provided. In each conduit 118, output lines, which electrically indicate the digital content of one of the counting networks, are conveyed to a multi-position switch, similar to switch 61. Each of these switches has a knob 119 and indexed contacts 120 set in the face 113 of the clock for providing ease in manual setting. The output from all the switches 61 are fed into a common conduit 122 which leads to a unit 123 containing all the individual mixing stages, such as stage 67. The output from all the mixing stages are then conveyed to the master mixing stage 71 where they are all mixed as previously explained. The output from the master mixing stage 71 which detects the total number contained in the clock is then fed into the inverter and cathode follower circuit unit 76 before feeding on the output line 90 to output pulse jack 124.

The reset circuit and input gate and control circuits which in the preferred embodiment are an integral part of the clock, are provided at the left of the housing 112. The reset switch 95 is disposed on the face 113 above the extreme left multiposition switch 61 provided for the hour counting circuit 86. The reset multivibrator 93 is located inside the housing 112. The control gate flip-flop 99 is located on the right of the multivibrator 93, and has its two manual setting switches 101 and 102, and its indicator light 104, located on the face 113 of the housing. The input gate 94 is located further to the center of the housing 112 and an input jack 125 is provided for feeding the input line 109 to the input gate 94.

In addition to the output pulse jack 124 and the input jack 125, a stop pulse jack 126 and a start pulse jack 127 are provided for electronically controlling the flip-flop 99.

The time base is preferably from a secondary frequency source comprising, for example, a temperature controlled quartz crystal oscillator. However, a built-in 100 cycle pulse source can be provided which can be substituted for the frequency standard if the accuracy desired is not greater than variations in line frequency.

It should be noted that if more accurate time intervals are required, and assuming that an accurate frequency standard source is available, the input pulse reception rate could be raised, for example, to 1000 cycles per second and the necessary counting circuit added.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has ben described in language more or less specific as to structural features, it is to be understood that the invention is not limited to the specific features shown, but that the means and construction herein disclosed comprise a prefered form of putting the invention into effect, and the invention is therefore claimed in any of its forms or modifications within the legitimate and valid scope of the appended claims.

What is claimed is:

1. A direct reading electronic clock comprising a precisely regulated source of operating pulses, a pulse counter for counting pulses from said source, said pulse counter comprising a plurality of counting circuits in cascade each arranged to operate through a cycle having the proper number of conditions for measuring units of time, means for visually indicating the content of each of said counting circuits, means for electrically indicating the content of each of said counting circuits, means for preselecting an electrical indication of one of the conditions of each of said counting circuits, gating means for the input to said pulse counter, a flip-flop for controlling said gating means, a high frequency pulse source, a first switching means for passing said high frequency pulses through said gating means for rapidly progressing said counting circuits to said preselected conditions, means for generating a pulse for triggering said flip-flop and thereby closing said gating means when all said counting circuits have reached said preselected electrical indications, a source of triggering signals having the known correct instant of time associated with each signal, a second switching means for closing said triggering signal source to said flip-flop thereby opening said gating means to said operating pulses on receipt of a triggering signal corresponding to the preselected setting of said counting circuits.

2. Apparatus in accordance with claim 1 wherein manual switches are provided for triggering said flip-flop.

3. An electronic time measuring device comprising a source of accurately timed pulses, a pulse counter for counting pulses from said source, said pulse counter comprising a plurality of counting circuits in cascade each arranged to operate through a cycle having the proper number of states for measuring units of time, means for indicating the existing stable states of each of said counting circuits, means for preselecting one of the stable states of each of said counting circuits, means for indicating when all said counting circuits have reached said preselected states, a high frequency pulse source for initially actuating said pulse counter, means for disconnecting said high frequency pulse source when said preselected states are reached, means for supplying accurately timed initiating signals corresponding to standard time, means for connecting said supply of accurately timed operating pulses into said pulse counter when said initiating signals correspond to the time represented by said preselected states.

4. A direct reading electronic clock comprising a precisely regulated source of operating pulses, a pulse counter for counting pulses from said source, said pulse counter comprising a plurality of counting circuits in cascade each arranged to operate through a cycle having the proper number of conditions for measuring units of time, means for visually indicating the content of each of said counting circuits, means for electrically indicating the content of each of said counting circuits, means for preselecting one of the electrical conditions of each of said counting circuits, gating means for the input to said pulse counter, a flip-flop for controlling said gating means, a reset multivibrator having a high frequency output, a reset switch having a fast and a slow and an off position, said fast position connecting said reset multivibrator to an intermediate counting circuit of said cascade for approximately setting said pulse counter to said preselected content of said pulse counter, said slow position connecting said reset multivibrator through said gating means to the first counting circuit of said cascade, means for generating a pulse for triggering said flip-flop and thereby closing said gating means when all said counting circuits have reached said preselected contents, said off position disconnecting said multivibrator, a supply swtch for connecting said operating pulses to said gating means, means for supplying triggering signals having the known time associated therewith, an initiating switch connecting said supply of triggering signals to sad flip-flop whereby manual closing of said supply switch enables the subsequent triggering pulse corresponding to the preselected setting of said counting circuits to open said gating means.

5. Apparatus in accordance with claim 4 wherein said pulse counter comprises sequentially in cascade, a hundredth of a second, a tenth of a second, a second, a ten second, a minute, a ten minute, and an hour counting circuit.

6. Apparatus in accordance with claim 4 wherein said pulse counter comprises sequentially in cascade: a hundredth of a second, a tenth of a second, a second, a ten second, a minute, a ten minute, and an hour counting circuit, and said slow position of said reset switch connects said reset multivibrator to the input of said second counting circuit.

7. A direct reading electronic clock comprising a housing, a clock and control face on said housing, inside said housing: a pulse counter; said pulse counter comprising a plurality of counting circuits in cascade for measuring units of time in seconds, minutes, and hours; matrices associated with each of said counting circuits for electrically detecting their contents; multiposition switches associated with each of said matrices; mixing circuit means for detecting the output of said switches; an output pulse forming circuit connected to the output of said mixing circuit means; a reset multivibrator; a reset switch for controlling the output of said multivibrator; an input gate for controlling the input to said pulse counter; a flip-flop for controlling said input gate; on the face of said housing: vertical rows of neon indicating lights associated with said second and minute counting circuits; a circular display of neon indicating lights associated with said hour counting circuit; individual dials and knobs for said multiposition switches; a dial and knob for said reset switch; manual off and on button switches associated with said control flip-flop; a start jack and a stop jack associated with said control flip-flop; an output pulse jack associated with said output pulse forming circuit; an input jack for supplying an operating pulse frequency.

8. In a counting circuit; a plurality of pulse operated flip-flop networks arranged in cascade; carry circuits between said flip-flops; circuit means for connecting the last flip-flop to the first flip-flop of said cascade to enable counting in an odd number radix; plate lines from the plates of each of the tubes of said flip-flops; a plurality of output lines, corresponding to the radix number of said counting circuit; means connecting the high potential plate lines of each number condition of said counting circuit to one of said output lines, whereby an electrical detection of the numerical content of said counting circuit is indicated by a high polarity on the corresponding output line.

9. Apparatus in accordance with claim 8 wherein said connecting means are resistors.

10. In a counting circuit, a plurality of pulse operated flip-flop networks arranged in cascade, carry circuits between said flip-flops, circuit means for connecting the last flip-flop to the second flip-flop of said cascade whereby an even number counting radix is provided, plate lines from the plates of each of the tubes of said flip-flops, a plurality of output lines corresponding to the number of unique counting conditions of the cascade excluding the first flip-flop, means connecting the high potential plate of each of said unique conditions to one of said output lines whereby an electrical selection of the particular unique condition is indicated by a high polarity on the appropriate output line, a pair of plate lines from said first flip-flop, an even and odd output lead, means for connecting said latter plate lines to said odd and even output leads, a first set of neon indicating bulbs connecting each of said output lines to said even output lead, a second set of neon indicating bulbs connecting each of said output lines to said odd output lead, whereby a low potential on said even output lead and a high potential on one of said output lines causes a neon bulb corresponding to an even digit to light, and a low potential on said odd output lead and a high potential on one of said output lines causes a neon bulb corresponding to an odd digit to light.

11. Apparatus in accordance with claim 10 wherein said means for connecting said plate lines to said output lines are resistors, and said means for connecting said plate lines to said odd and even output lines are voltage dividers.

References Cited in the file of this patent
UNITED STATES PATENTS

| | | |
|---|---|---|
| 1,928,794 | Poole | Oct. 3, 1933 |
| 1,997,979 | Smith | Apr. 16, 1935 |
| 2,301,197 | Bradford | Nov. 10, 1942 |
| 2,332,300 | Cook | Oct. 19, 1943 |
| 2,410,156 | Flory | Oct. 29, 1946 |
| 2,414,107 | Kenyon | Jan. 14, 1947 |
| 2,422,698 | Miller | June 24, 1947 |